Nov. 1, 1932.  J. G. BRADBURY  1,885,581
CONDUIT FITTING
Filed Oct. 24, 1929
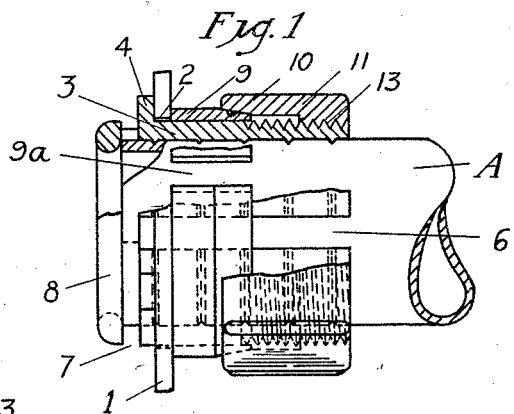
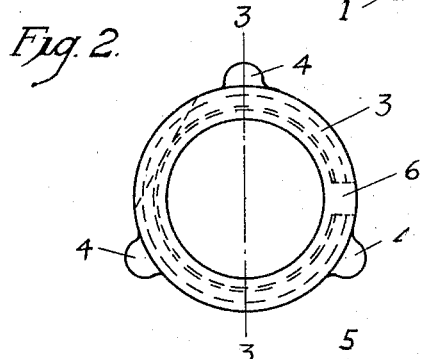
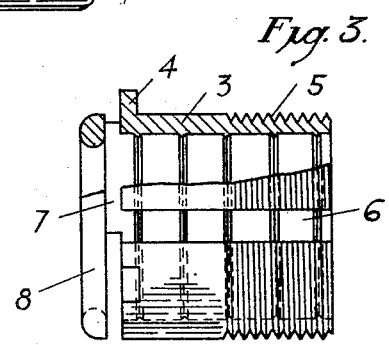
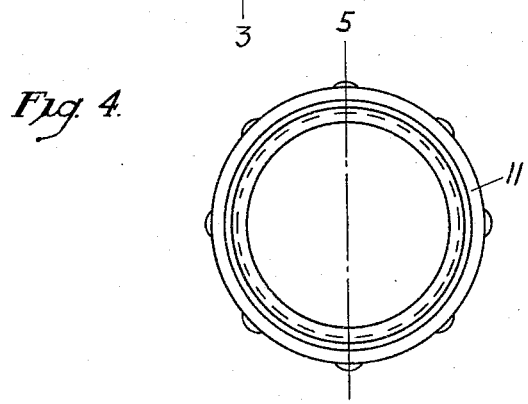
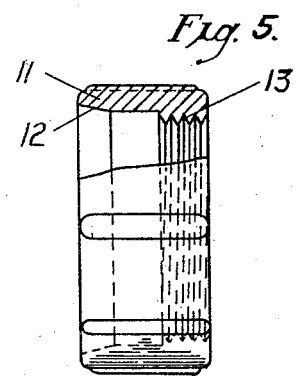
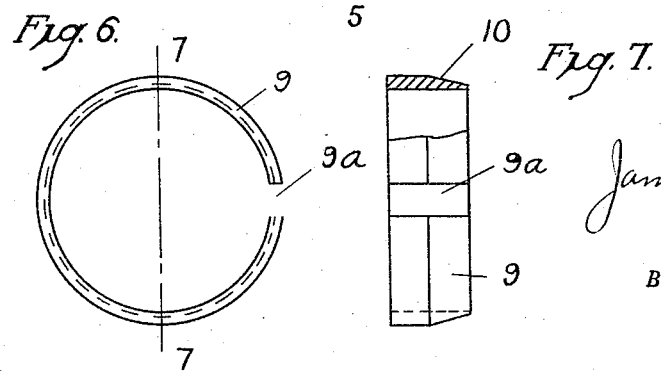
James G. Bradbury
INVENTOR.
BY
ATTORNEYS.

Patented Nov. 1, 1932

1,885,581

UNITED STATES PATENT OFFICE

JAMES G. BRADBURY, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed October 24, 1929. Serial No. 402,153.

The present invention is designed to improve conduit fittings, particularly adapting such fittings for openings such as are ordinarily encountered in knock-out boxes. The fitting is further arranged to receive and secure a threadless conduit. Features and details of the invention will appear from the specification and claims.

A preferred embodiment of the invention is illustrated in the accompanying drawing as follows:—

Fig. 1 shows a side elevation of a fitting, partly in section.

Fig. 2 an end view of a contractible clamping sleeve.

Fig. 3 a section on the line 3—3 in Fig. 2.

Fig. 4 an end view of the outer wedge nut.

Fig. 5 a section on the line 5—5 in Fig. 4.

Fig. 6 an end view of a wedge ring.

Fig. 7 a section on the line 7—7 in Fig. 6.

1 marks the wall of an ordinary knock-out box in which is arranged an opening 2.

A contractible sleeve 3 is provided with ears 4 forming a shoulder for engaging the inner surface of the wall of the box, said sleeve in position extending through the opening with the shoulders against the inner surface of the box. The sleeve is provided with screw threads 5 at its outer end and has a longitudinal slot 6 extending from its outer end inwardly to a circumferential slot 7. A guard shoulder 8 with a leading-in surface is arranged at the inner end of the sleeve and inside of the circumferential slot 7.

A wedge ring 9 made contractible by a slot 9a is arranged around the sleeve 3. It has a wedge surface 10 at its outer end and its inner end abuts against the outer wall of the outlet box wall.

A wedge nut 11 has a wedge surface 12 adapted to engage the wedging surface 10. It has internal screw threads 13 adapted to operate on the threads 5.

When the nut 11 is set up it performs two functions. It exerts rearward pressure on the wedge sleeve 9 and forward pressure on the sleeve 3 so as to clamp the wall of the box between the shoulders 4 and the rear edge of the ring 9. At the same time the wedging surfaces contract the wedge ring and with it the slotted sleeve 3, this contraction being adapted to clamp an inserted threadless conduit A and secure it with the outlet box. It will be noted that by the setting up of the nut alone not only the fitting is made rigid with the box but the conduit is also made rigid and secured with a fitting.

What I claim as new is:—

1. In a conduit fitting, the combination of a slotted sleeve adapted to be passed through a conduit box opening; locking means on the inner end of the sleeve adapted to engage the wall of a box with the sleeve in the opening; wedging means on the outer end of the slotted sleeve adapted through its wedging action to contract the sleeve; and means on the sleeve acting on the wedging means to contract the sleeve.

2. In a conduit fitting, the combination of a slotted sleeve adapted to be passed through a conduit box opening; locking means on the inner end of the sleeve adapted to engage the wall of a box with the sleeve in the opening; wedging means on the outer end of the slotted sleeve adapted through its wedging action to contract the sleeve; and means on the sleeve acting on the wedging means to contract the sleeve and to co-act with the locking means to clamp the wall of a box through which the sleeve extends.

3. In a conduit fitting, the combination of a contractible slotted sleeve having a shoulder at its inner end; a wedge sleeve on the contractible sleeve and opposing the shoulder; and a nut on the slotted sleeve acting on the wedge sleeve.

4. In a conduit fitting, the combination of a sleeve, said sleeve having a longitudinal slot terminating in a circumferential slot, the sleeve having a leading in surface within the circumferential slot and a shoulder extending from the sleeve located outwardly from the circumferential slot, said shoulder being adapted to engage a box wall in which the sleeve is inserted in a plane at right angles to the axis; and means on the outer end of the sleeve contracting the same.

5. In a conduit fitting, the combination of a sleeve, said sleeve having a longitudinal slot terminating in a circumferential slot, the sleeve having a leading-in surface within the circumferential slot and a shoulder extending from the sleeve located outwardly from the circumferential slot, said shoulder being adapted to engage a box wall in which the sleeve is inserted; a wedge sleeve on the outer end of the sleeve; and means operating on the wedge sleeve clamping the wall between the wedge sleeve and the shoulder and contracting the wedge sleeve and the slotted sleeve.

6. In a conduit fitting, the combination of a sleeve, said sleeve having a longitudinal slot terminating in a circumferential slot, the sleeve having a leading-in surface within the circumferential slot and a shoulder extending from the sleeve located outwardly from the circumferential slot, said shoulder being adapted to engage a box wall in which the sleeve is inserted; a wedge sleeve on the outer end of the sleeve; and a nut on the slotted sleeve acting on the wedge sleeve clamping the wall between the wedge sleeve and the shoulder and contracting the wedge sleeve and the slotted sleeve.

7. A conduit fitting including a circumferentially contractible sleeve adapted to be secured against rotation within an opening in an outlet box and including means to provide an abutment for a conduit end disposed within the sleeve, a circumferentially contractible collar encircling the sleeve and adapted to abut the outer face of the box and a nut having threaded engagement with the sleeve operative to contract the collar as the nut is screwed home upon the sleeve.

8. A conduit fitting including a circumferentially contractible sleeve adapted to be secured against rotation within an opening in an outlet box and including means to provide an abutment for a conduit end disposed within the sleeve, a circumferentially contractible collar encircling the sleeve and adapted to abut the outer face of the box and a nut having threaded engagement with the sleeve operative to contract the collar as the nut is screwed home upon the sleeve, the collar and nut including cooperating tapered, camming surfaces operative to effect contraction of the collar as the nut is screwed home.

9. Means for coupling a conduit to an outlet box or the like including a contractible sleeve member adapted to receive a conduit end and be secured in an outlet box opening, a circumferentially contractible collar member encircling the sleeve and a nut screwed on to the outside of the sleeve and operable to contract the collar member, the nut and collar member having coacting, tapered camming faces.

In testimony whereof I have hereunto set my hand.

JAMES G. BRADBURY.